United States Patent [19]
Gilford et al.

[11] 3,881,827
[45] May 6, 1975

[54] FLOW CELL

[75] Inventors: Saul R. Gilford, Oberlin; Gary M. Freeman, Grafton; John H. Bauman, Berea, all of Ohio

[73] Assignee: Gilford Instrument Laboratories, Inc., Oberlin, Ohio

[22] Filed: Jan. 11, 1974

[21] Appl. No.: 432,476

Related U.S. Application Data
[62] Division of Ser. No. 332,929, Feb. 16, 1973, Pat. No. 3,820,530.

[52] U.S. Cl.............................. 356/246; 356/181
[51] Int. Cl. ............................................ G01n 1/10
[58] Field of Search.................... 356/39, 181, 246; 128/2.05 F

[56] References Cited
UNITED STATES PATENTS
3,527,542  9/1970  Penhasi et al...................... 356/246

*Primary Examiner*—Vincent P. McGraw
*Attorney, Agent, or Firm*—Baldwin, Egan, Walling & Fetzer

[57] ABSTRACT

Apparatus and method for practicing the Stewart-Hamilton method of measuring cardiac output but with dynamic calibration.

The apparatus includes a chamber into which a precise quantity of dye can be introduced for admixture with blood in the chamber. The flow of a subject's blood can then be switched from normal measuring flow through the densitometer to calibrating flow through the densitometer by a simple mechanical operation without stopping the procedure and without need for sterilization of any apparatus or changing of any equipment. An important component of the apparatus is a combined mixing chamber and cuvette which is disposable.

3 Claims, 4 Drawing Figures

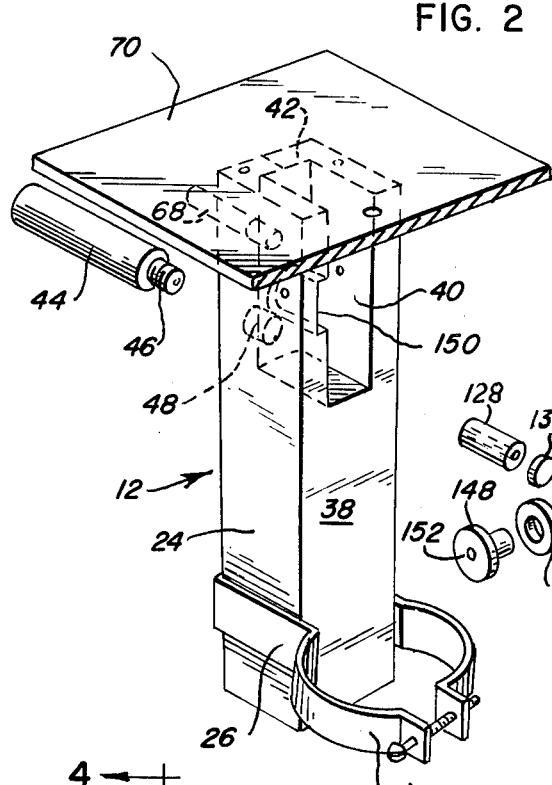
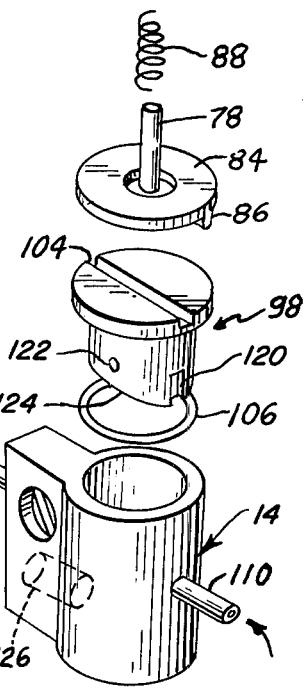
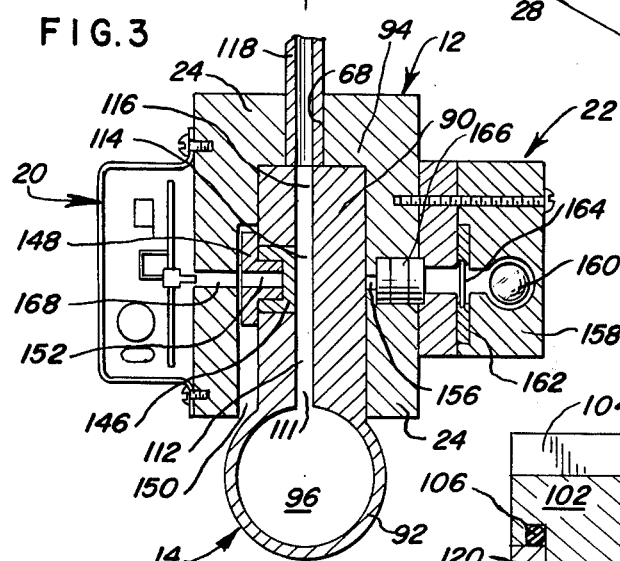
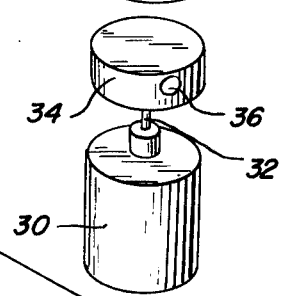
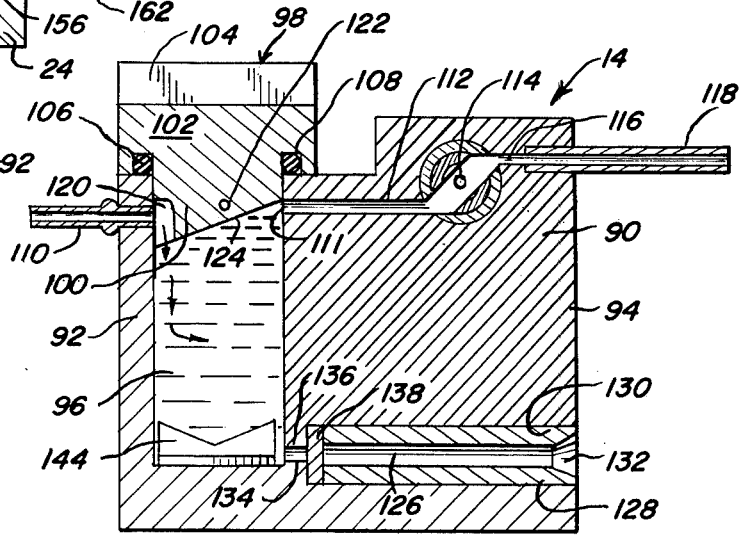

FLOW CELL

This is a division of application Ser. No. 332,929 filed Feb. 16, 1973 and now Pat. No. 3,820,530.

BACKGROUND OF THE INVENTION

The invention herein relates to a method and apparatus for calibrating densitometer systems used for measuring the flow-rate of blood through a subject's heart.

A technique in use today for measuring the flow-rate of blood through the heart is known as the Stewart-Hamilton method. According to this method, a suitable dye or other tracer material is injected into the heart through a venous input vessel and blood is drawn from an arterial vessel. The rate at which the injected material is diluted in its passage through the heart is a measure of the rate of flow of blood.

In order to draw the blood from the artery at a uniform rate, the blood stream is pumped to smooth the normal heart pulsing. The blood is flowed through a densitometer which measures the absorbance of light by the blood and produces output signals which can be plotted to give a curve of dilution versus time. This dye curve is then operated upon in accordance with a mathematical formula which has been classically derived to produce the so-called cardiac output curve.

Densitometers are available to provide plots of the original dye curve and the necessary computation can be made manually or by computer.

Heretofore, the most difficult part of the technique has been the calibration of the dye dilution curve to give the actual units of dye concentration in the blood. Normally, this has been effected by withdrawing blood from the patient prior to carrying out the dye dilution procedure and mixing aliquots of this withdrawn blood with known concentrations of the tracer material which is to be used in the technique. The resulting measurements are introduced into the densitometer to establish the quantitative value of its output.

This procedure is very demanding and even when accomplished with extreme care often produces erroneous results. In addition, it requires fairly substantial amounts of blood from the subject which is particularly undesirable in instances where the subject is a child. It also requires considerable time.

Because of the peculiarities and complex nature of the blood-dye mixture, the instrument must be calibrated at least once for each subject, and preferably, more than once during the measurement procedures. Thus, the calibration procedure is the weakest aspect of a technique which, although widely accepted and used, could be considered more reliable but for calibration inaccuracy.

Recently, a calibration technique was proposed for dye dilution densitometry in which the calibration was performed dynamically. In principle, an external model of the circulation system was set up in which a small chamber suitably scaled in size was introduced into the blood withdrawal system connected to the subject's artery in such a way that the subject's blood was drawn through this external mixing chamber and then through the densitometer by the same withdrawal pump that was used for the normal dye dilution curve on the subject. An accurately measured amount of dye is injected into the system ahead of the mixing chamber to be passed through the chamber and a dye dilution curve is recorded very similar in characteristics to that recorded from the subject itself. By suitably scaling the dimensions of the mixing chamber and the quantity of dye injected, it is possible to get a dye dilution curve which is almost identical in amplitude and time constant to the curve from the subject. In the calibration loop, however, the actual flow rate through the mixing chamber is known since it is determined by the withdrawal pump used in the system. Thus, a dye dilution curve is produced in which the flow rate is known and can be related to the dye dilution curve generated in the subject to determine the unknown flow rates.

The dynamic calibration technique has been described in the literature, including articles by Emanual, Hamer, et al., 28 British Heart Journal 143–146 (1966); Shinebourne, Fleming, et al., 29 British Heart Journal 920–925 (1967); and Volim and Rollet, Journal of Applied Physiology, January, 1969, page 147.

The technique has not been universally adopted because the equipment required and the techniques described are not practical for use in clinical laboratories which are required to perform many routine tests continuously, including the blood dye dilution test. The technique as heretofore described requires skilled technicians, careful measurements and considerable time. Most laboratories are unwilling to go through the procedure because of the time consumed and because of the expense resulting. The skill of highly paid laboratory technicians is needed for other tasks.

According to the invention, the important advantages of the dynamic calibration technique are achieved with none of the disadvantages. The method and apparatus of the invention are simple and reliable. The apparatus is so economical that the blood carrying components are disposable. The calibration apparatus and method do not in any way disturb the subject and use a minimum quantity of blood. The blood dye dilution measurement is not interrupted or rendered complex by the method and apparatus. The apparatus enables accurate calibration measurements by taking cognizance of a discovery relating to dye equilibration described hereinafter.

SUMMARY OF THE INVENTION

According to the invention, a disposable structure is provided which has a mixing chamber with an integral mixer, a single control transfer valve, a sample dye input septum and an integral flowthrough cuvette. This structure is mounted in a holder which contains the dye injection means, the source of light and photoresponsive elements of the densitometer and the mixing motor. The blood input is coupled to the mixing chamber and blood is carried out of the mixing chamber through suitable ports, the transfer valve enabling the operator to divert blood through the chamber or bypass the chamber.

The disposable structure is easily installed and removed from the holder. The dye curve technique is not interrupted by the calibration procedure on account of the compactness and ease of operation of the calibration apparatus.

The method consists of running blood into the mixing chamber, introducing a known quantity of dye by injection into the chamber and mixing the same, then flowing the blood through the chamber into the densitometer and making the measurements.

BRIEF DESCRIPTION OF THE DRAWINGS

FIG. 2 is a perspective exploded view of the principal parts of the apparatus;

FIG. 3 is a sectional view through the apparatus taken generally along the line 3—3 of FIG. 1 and in the indicated direction;

FIG. 4 is a sectional view taken generally along the line 4—4 of FIG. 3 and in the indicated direction.

DESCRIPTION OF THE PREFERRED EMBODIMENT

Figure 1:
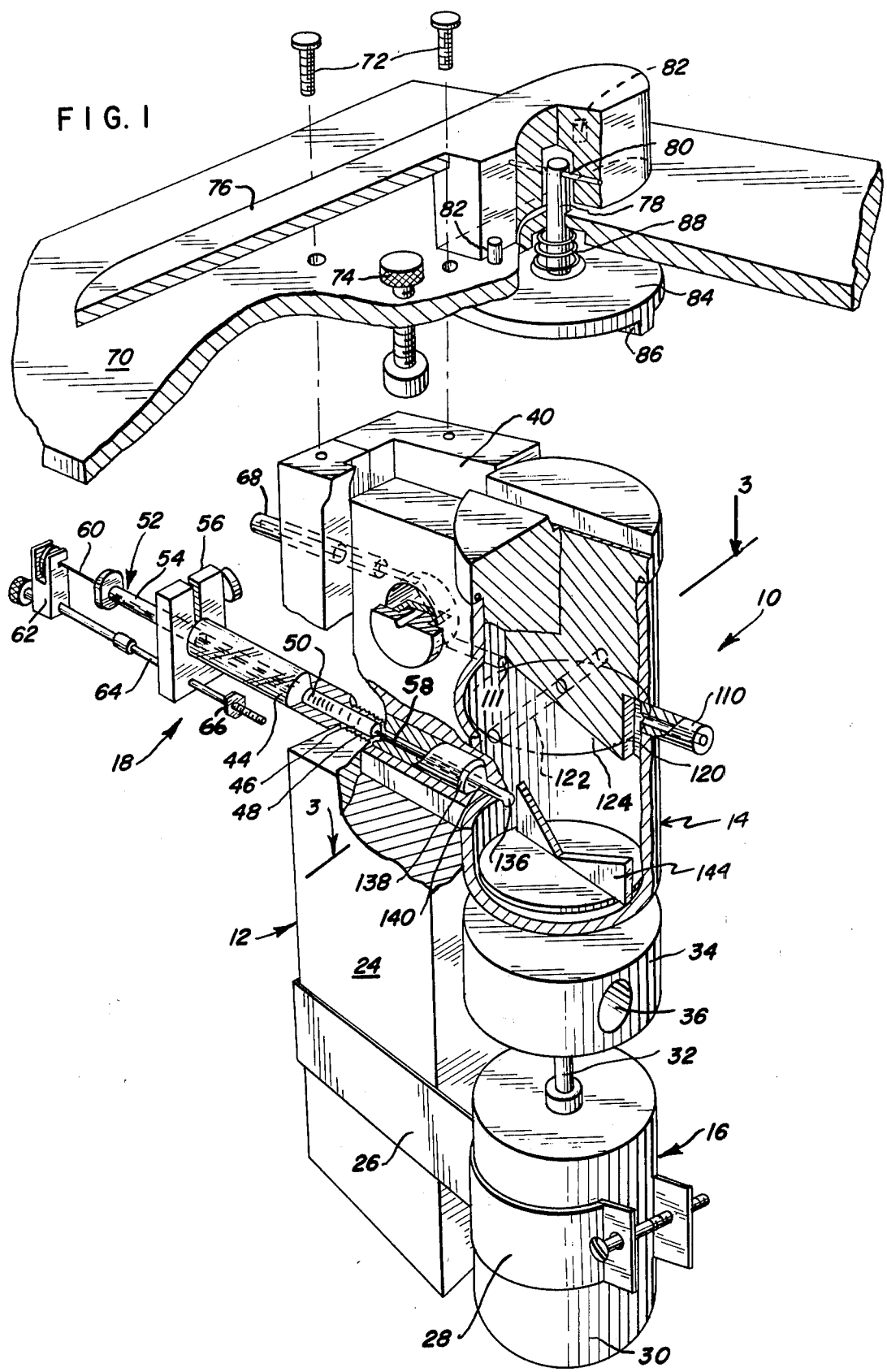
FIG. 1 is a perspective view with portions broken away, in section and exploded showing the apparatus of the invention, ready for use.

The apparatus of the invention is designated generally by the reference character 10, the same comprising generally several principal components. There is a vertical standard or holder 12 which receives a disposable mixing chamber and cuvette 14 in a suitable cavity, a mixing motor 16 mounted to the holder 12 and structure 18 for associating a calibrating dye-injecting syringe also mounted to the holder. Although not shown in the other views, in FIG. 3 there are illustrated in generally symbolic form an electronic device 20 and a radiation source 22 mounted on opposite sides of the holder 12. The radiation source 22 can be, for example, a source of light with suitable auxiliary apparatus and the electronic device 20 can be apparatus providing a signal output responsive to the radiation or light which it receives from the radiation source 22.

The holder 12 comprises a vertically arranged block 24 of opaque plastic, metal or the like nonlight-transmitting material which remains as a permanent part of the apparatus 10, it being appreciated that a portion of the apparatus is preferably disposable. Adjacent its bottom end, the block mounts a simple strap clamp 26 having resilient or mechanically contractible fingers 28 between which there is secured a small electric motor 30 adapted to be selectively energized from a suitable electrical source (not shown). The shaft 32 of the motor is arranged vertically and carries a rotor 34 within which there is embedded a small permanent magnet 36. The rotor 34 is arranged to engage quite closely to the bottom of the disposable mixing chamber and cuvette 14 as will be explained.

The surface of the block 24 facing to the right in FIGS. 1 and 2 will be considered its front surface and is designated 38. A cavity 40 which is generally boxlike in configuration is formed in the upper end of the block 24 opening to the surface 38. This leaves a relatively thin wall 42 at the rear of the block 24. Adjacent the bottom end of the wall 42 is a support tube 44 generally cylindrical in configuration and having a threaded nipple 46 which engages into a threaded socket 48 provided in the wall 42. The tube is hollow so that there is a bore 50 on the interior thereof. An accurate syringe 52 has its barrel 54 engaged in the bore 50 and clamped to the tube 44 by the clamp 56. The needle 58 of the syringe 52 passes through the tube 44 and is adapted to enter the mixing chamber and cuvette component 14 in a manner to be explained. The plunger rod 60 of the syringe 52 is mounted on a block 62 that cooperates with an adjustable rod 64 passing through a suitable perforation in the clamp 56. Penetration of the needle 58 into a septum, which will be described hereinafter, is controlled by the location of the syringe barrel 54 with respect to the tube 44, this being provided by the adjustment of the clamp 56. The stroke of the plunger rod 60 is controlled by the rod 64 and the nut 66.

Adjacent the top of the wall 42 there is provided a sleeve 68 which passes through the wall. The purpose of this sleeve, which could be a simple hole through the wall, is to guide the output nipple of the mixing chamber and cuvette component 14 when the latter is in place, as will be explained.

A relatively large plate 70 is screwed to the top end of the block 24 by suitable fasteners 72. The plate carries a screw clamp 74 which has a knurled head above the plate and a pressure pad below, aligned with the cavity 40. After the component 14 is inserted in place in the cavity 40, the screw clamp 74 is used to press the component 14 into tight engagement with the holder 12. The plate 70 also has a swinging handle 76 adapted for swivel movement about the shaft 78 to which the handle is pinned at 80, the angular movement being indexed and limited to some angle by suitable protruding pins 82.

This angle is shown to be about 90° in the drawings but preferably is much less, say about 30° so that the switching function can be accomplished quickly. If continuous recording is being effected, the base line of the resulting graph is thus not greatly affected.

The bottom end of the shaft 78 has a disc 84 integral therewith, the bottom of the disc 84 having a depending ridge 86 for a purpose to be described. The shaft 78 provides substantial clearance between the disc 84 and the bottom of the plate 70 and a coiled spring 88 coaxial with the shaft 78 biases the disc to its lowermost position. Raising the handle 76 against the bias of the spring 88 will raise the disc 84 and cause at least disengagement of the ridge 86 from the valve, which will be described.

The disposable component 14 will now be described. This component 14 is preferably fabricated from plastic molded members suitably held together by electronic welding or cement but for the movable parts thereof. There are two main parts, a flange portion 90 and a cylindrical portion 92, with the flange portion 90 having the axis of the cylindrical portion 92 lying in the median plane thereof. The outer edge 94 of the flange portion 90 is parallel with the axis of the cylindrical portion 92.

The cylindrical portion 92 is hollow and forms a mixing chamber 96. A closure member 98 is tightly engaged within the upper end of the chamber 96 and comprises a reduced diameter plug portion 100 and an enlarged head 102. The head 102 has a large transverse slot 104 adapted to be engaged by the ridge 86 so that when the handle 76 is swivelled, it will turn the closure member 98 as well. Any other type of separable cooperative coupling can be used, such as for example, lugs and slots. It is preferred, however, that the coupling be effected by a sliding movement. An elastomeric O-ring 106 fits into a groove 108 provided in the head 102 to render the chamber 96 liquidtight when the closure member 98 is in place.

The component 14 has several passages therein which are formed by molding, drilling, etc. There is a nipple 110 set into a wall of the cylindrical portion 92 adjacent the upper end thereof and providing a passageway from the exterior of the component 14 either into the chamber 96 or by-passing the chamber, depending upon the position of the closure member 98.

A passageway 112 is provided in the flange portion 90 passing from the chamber 96 adjacent the upper end thereof partway through the flange portion 90. The passageway 112 and the bore of the nipple 110 are aligned. In the center of the flange portion 90 adjacent the upper end thereof there is provided a relatively rectangular cavity 114 which serves as a cuvette and hence will be termed as such. This cuvette 114 is arranged at an angle and connects with a passageway 116 that is formed in the flange portion 90 to provide the discharge of fluid from the component 14. There is a short length of pipe 118 set into the outer edge 94 of the flanged portion 90 aligned with the passageway 116, this comprising the output nipple previously mentioned. When the component 14 is assembled within the cavity 40, this output nipple 118 will pass through the sleeve 68 and provide means to attach flexible conduits to the apparatus 10 for recirculating the blood passing through the apparatus.

The construction of the closure member 98 is such as to constitute the same a two-way valve. When the position of the closure member 98 is as shown in FIG. 4, the blood which enters by way of the input nipple 110 flows into a recess 120 and into the chamber 96. After the chamber has been filled, the blood leaves by way of the chamber discharge port 111, enters the passageway 112 and flows through the cuvette 114, the passageway 116 and out of the output nipple 118. The bottom surface of the closure plug 100 is formed on an angle 124 to uncover the entrance to passageway 112. Importantly, this angular arrangement 124 promotes clearing of bubbles from chamber 96 since the bubbles will rise to the surface and be moved to the chamber discharge port 111 by the angled surface 124.

If the closure member is turned to align a straight-through transverse passage 122 with the input nipple 110 and the passageway 112, the plug portion 100 will block flow to the chamber 96 so that blood entering the input nipple 110 flows directly through the passageway 124 to the passageway 112, by-passing the chamber 96.

The bottom of the component 14 has a passageway 126 formed in a cylindrical plug 128 that is set into a hole 130 drilled through the flange portion 90 in alignment with the bore 50 of the tube 44. The entrance to the bore 126 is countersunk, as shown at 132, for piloting purposes, since this bore 126 will receive the needle 58 of the syringe 52. The hole 130 is drilled in a manner to stop just short of the chamber 96 to provide a shoulder 134 and a short passageway 136. When the plug 128 is inserted into place, a small disc or septum 138 of elastomeric material is first engaged against the shoulder 134, thereby blocking passage of fluid between the bore 126 and the chamber 96.

This structure is intended to be used to inject dye into the chamber 96 and it is done simply by pushing the point 140 of the needle 58 through the septum 138 so that it lies in the short passageway 136 and then manipulating the plunger. The needle point or cannula 140 is easily withdrawn without permitting loss of fluid from the chamber 96, the elastomeric material being self-sealing.

The bottom of the chamber 96 has a loose paddle wheel 144 that has a permanent magnet or other ferromagnetic material embedded therein. Rotating the shaft 32 of the motor 30 will rotate the rotor 34 and magnetically couple the paddle wheel 144 with such rotation for mixing the liquid in the chamber 96.

Attention may now be directed to the cuvette 114 and related structure. The cuvette 114 is cut or molded into a cylindrical cavity as best shown in FIG. 2 and the cavity is plugged with a small cylindrical plug 146. This plug 146 is made out of transparent plastic and is cup-shaped. An opaque plug 148 is engaged into the plug 146, the opaque plug having a relatively large flanged head and a central light passageway 152. The flanged head overlies the surface of the flanged portion 90 of the component 14 and the cavity 40 has a groove 150 to receive the flange when the assembled component 14 is pushed home. Aligned with the passageway 152 on the opposite side of the opaque block 24 there is provided the radiant source 22 which produces a beam of light passing through the opening 156 across the transparent walls of the flanged portion 90, through the liquid flowing in the cuvette 114, through the plug 146 and out of the opening 152. The construction of the plug 148 prevents light leakage.

The block 24 is not light transmissive, but the flange portion 90 does transmit light, preferably being molded from some clear synthetic resin (popularly referred to as "plastic" but relatively rigid) suitably compatible with the fluids to be transported. Light cannot be piped around the flange portion by way of the block 24 but must pass through the flange portion. The cuvette 114 may be accurately molded between passageways 112 and 116. Its right-hand face (FIG. 3) is perfectly flat and parallel with the large surfaces of the flange portion 90. It is formed at the bottom of a cylindrical recess or cavity plugged with the cup-shaped plug 146. The inner surface of the plug 146 provides the left-hand (FIG. 3) perfectly flat surface of the cuvette 114 accurately parallel with the right-hand face. The reduced diameter probe of the opaque button or plug 148 enters well into the cup of the plug 146 and hence being its light passageway 152 very close to the cuvette 114 to receive the light passed through said cuvette, excluding any diffused or scattered light which may have passed elsewhere through the flange portion 90. The overlying disc-like outer flange of the plug 148 engages directly against the inner surface of the left-hand wall of the cavity 40 within the slot 150 so that any possible by-passing light is excluded at this point as well.

The radiant source comprises a housing 158 fastened to the block 24 and having a light source such as a tungsten bulb 160 mounted therein to be energized from some suitable electrical power source. A holder 162 mounts a calibrated attenuator 164 to give the resulting light energy desired when calibration is taking place. Otherwise for normal dye dilution measurements this attenuator is not in position. It is placed in intercepting position when blood flows through the chamber 96. An interference filter arrangement 166 completes the structure and directs the beam as described above.

On the other side of the holder 12, a hole 168 directs the light beam to the electronic device 20 which is a part of the densitometer by means of which the desired data will be acquired.

In use, the apparatus is set up to permit the blood flow of the patient to pass through the cuvette 114 for the normal dye dilution curves to be made with the closure in position so that the passageway 122 is used, by-passing the chamber 96. By manipulation of the handle 76 at the beginning of the test the chamber 96 is filled with the subject's blood to be able to effect the calibration procedure as a part of the test. When a calibration is desired, the precise amount of dye is injected into the chamber 96 through the septum 138 and the closure or valve is quickly switched to the condition shown in FIG. 4. There is no interruption of the procedure, everything remains sterile and no time is lost. The entire component 14 can be made very economically and it can be discarded after the tests have been run.

It will be appreciated that the chamber 96 is filled with blood while the subject's principal flow is bypassing the same. The dye is thus injected into the chamber under conditions of zero flow and mixed for a short while, thus also giving a slight delay to permit dye equilibration.

We have discovered that it is essential for calibration accuracy that the normal type of dyes used in dye-dilution techniques must be given a period of time while mixed with blood to stabilize. The prior techniques and structures showed no appreciation of this important discovery. In known dynamic calibration technique no provision was made for introduction of the dye material into a mixing chamber with the blood remaining in the chamber for a delay time at zero flow (although being mixed) to give the dye material an opportunity to achieve a condition of stable relationship with the blood.

Herein, the arrangement with the substantial self-sealing septum 138 which permits introduction of the dye into the chamber 96 (in liquid form, of course) without loss of fluid from the system is important. Flow is not interrupted and the desired delay is achieved while also mixing the dye and the aliquot of blood outside of the direct flow of blood through the cuvette. The switchover for calibration is effortless and can be accomplished almost instantaneously and clearly without stopping the procedure or the flow of the subject's blood. The inclusion of the septum arrangement in the disposable component 14 assures sterility at all times and for each successive cardiac output determination.

While it is preferred to have the component 14 readily disposable, it is feasible to provide apparatus using the teachings of the invention which is permanent and adapted to be cleaned and sterilized between determinations.

In installing the disposable component 14 the screw 74 is retracted and the handle 76 is turned so that the ridge 86 (or other coupling means) is aligned as shown in FIG. 1 parallel with the long dimension of the groove 150, that is, right and left in FIGS. 1 and 2. The groove 104 is also aligned parallel with the direction in which the component 14 is to be slid into the cavity 40. As the component 14 is slid into place with the outer disc-like flange of the plug 148 engaged into the groove 150, the handle 76 is raised against the bias of the spring 88 raising the disc 84 sufficient to enable the component 14 to be pushed home. The handle 76 is then released to cause engagement of the coupling means 86 and 104. Thereafter, the screw 74 is tightened, the flexible tubing extending to the subject is connected to the apparatus 10 and the process may be commenced. To remove the component 14, the tubing to the subject is disconnected, the screw 74 is loosened, the handle 76 is raised and the component 14 is slipped out and discarded. It is appreciated that even if the operator has neglected to withdraw the needle tip 140 from the septum 138, the withdrawal of the component 14 from the cavity 40 of the holder will disengage the said needle tip 140 and the self-sealing character of the septum will keep any remaining fluids in the chamber 96 from leaking out.

Although not shown, suitable means are provided accessible from the top of the plate 70 to enable the attenuator 164 to be moved into or out of the path of the light beam from the lamp 160.

It will be appreciated from the above description that many variations in the apparatus of the invention and some variations in the method may be made without departing from the spirit or scope thereof as defined in the appended claims.

What it is desired to secure by Letters Patent of the United States is:

1. A cuvette for use in dye-dilution techniques requiring densitometry and comprising:
   A. a block of transparent material,
   B. a cavity formed in said block in the center thereof and opening to the side of said block and configured to form a cuvette for passage of light in a path from side to side of the block and passage of fluid from end to end of the block transverse of said path,
   C. passageways from opposite ends of said block connected to the cuvette to transport fluid through said cuvette,
   D. a plug of transport material in said cavity and having its inner surface defining one surface of said cuvette normal to said path, said plug having a cylindrical bore therethrough stopping short of said inner surface, and
   E. a button of opaque material having a disc-like head and stem with a central axial light passageway through the head and stem, the stem being engaged in the bore of the plug with the head overlying the side around said cavity with the light passageway aligned with said path.

2. The cuvette as claimed in claim 1 in which the passageways connect with said cuvette along directions which are displaced from one another so that flow through said cuvette is on an angle with respect to said directions.

3. The cuvette as cliamed in claim 1 in which said stem extends to the bottom of said bore.

* * * * *